US006538681B2

(12) United States Patent
Lee

(10) Patent No.: US 6,538,681 B2
(45) Date of Patent: Mar. 25, 2003

(54) DIGITAL PRINT HEAD DATA REGISTRATION

(75) Inventor: Daniel John Lee, Brentwood (GB)

(73) Assignee: Neopost Limited, Romford (GB)

( * ) Notice: Subject to any disclaimer, the term of this patent is extended or adjusted under 35 U.S.C. 154(b) by 119 days.

(21) Appl. No.: 09/847,587

(22) Filed: May 3, 2001

(65) Prior Publication Data

US 2002/0003566 A1 Jan. 10, 2002

Related U.S. Application Data

(63) Continuation of application No. 09/237,811, filed on Jan. 27, 1999, now abandoned.

(30) Foreign Application Priority Data

Jan. 28, 1998 (GB) .......................................... 9801743

(51) Int. Cl.[7] ......................... G07B 17/00; G03B 17/04

(52) U.S. Cl. ................................................. 347/211

(58) Field of Search .............................. 347/211, 222, 347/205, 206, 194; 400/124.11; 705/405, 410

(56) References Cited

U.S. PATENT DOCUMENTS

| | | | | | |
|---|---|---|---|---|---|
| 5,307,280 A | * | 4/1994 | Haug | ......................... | 705/405 |
| 5,453,776 A | | 9/1995 | Gunther | | |
| 5,671,146 A | * | 9/1997 | Windel et al. | .............. | 705/410 |
| 5,838,356 A | * | 11/1998 | Gunther et al. | ............. | 347/194 |
| 5,912,682 A | | 6/1999 | Parkos | | |

* cited by examiner

*Primary Examiner*—Lamson Nguyen
*Assistant Examiner*—K. Feggins
(74) *Attorney, Agent, or Firm*—Shoemaker and Mattare

(57) ABSTRACT

Data identifying a print head of a postage meter is registered on the print head by allocating a number of printing elements of the print head to represent a code identifying the print head. The allocated printing elements are not used for printing postage indicia. The print head may be an ink jet print head having resistive elements energisable to eject ink droplets from nozzles. In order to represent the code, the resistance of selected ones of the resistive elements allocated to represent the code is altered for example by fusing the resistive elements.

12 Claims, 1 Drawing Sheet

DIGITAL PRINT HEAD DATA REGISTRATION

This is a continuation of application Ser. No. 09/237,811, filed Jan. 27, 1999 now abandoned.

BACKGROUND OF THE INVENTION

This invention relates to storing data by means of a digital print head and in particular storing the identification of digital print heads, for example thermal print heads or ink jet print heads, used in printing apparatus.

Digital print heads include a plurality of selectively operable printing elements. Commonly the printing elements are disposed in a line. The digital print head is mounted in printing apparatus and either the print head is moved relative to a print receiving medium or a print receiving medium is moved relative to the print head such that the print receiving medium is scanned by the print head. During the movement of the print head or the medium, the printing elements are operated selectively and successively in a plurality of print cycles to print dots that form desired characters or patterns on the print receiving medium.

The printing apparatus in which the print head is mounted may be a computer output printer or may be part of a postage meter for printing postage indicia on mail items.

Sometimes it is important, particularly in relation to postage meters and similar secure printing apparatus, to ensure that only an identified print head is utilised in the printing apparatus. Accordingly in order to ensure that only identified print heads are utilised in the printing apparatus it is necessary to provide the print head with means whereby the print head can be identified.

SUMMARY OF THE INVENTION

According to one aspect of the invention a method of registering data in relation to a digital print head having a plurality of selectively energisable printing elements comprises the steps of allocating first printing elements of said plurality of printing elements for representing data and altering a characteristic of selected first printing elements to represent said data.

According to a second aspect of the invention a method of registering data in relation to a digital print head having a plurality of selectively energisable print elements comprises the steps of allocating first printing elements of said plurality of printing elements for representing data; allocating second printing elements of said plurality of printing elements for printing required impressions and altering a characteristic of selected first printing elements to represent said data.

According to a third aspect of the invention printing apparatus includes a digital print head having a plurality of printing elements, first elements of said plurality of printing elements being allocated for normal printing of printed impressions and second elements of said plurality of elements being allocated for representing data; and data writing means operable to change an electrical characteristic of selected second elements to represent said data.

The printing apparatus may be postage indicia printer of a postage meter.

BRIEF DESCRIPTION OF THE DRAWING

An embodiment of the invention will now be described by way of example with reference to the drawings in which.

DESCRIPTION OF THE PREFERRED EMBODIMENT

Figure 1:
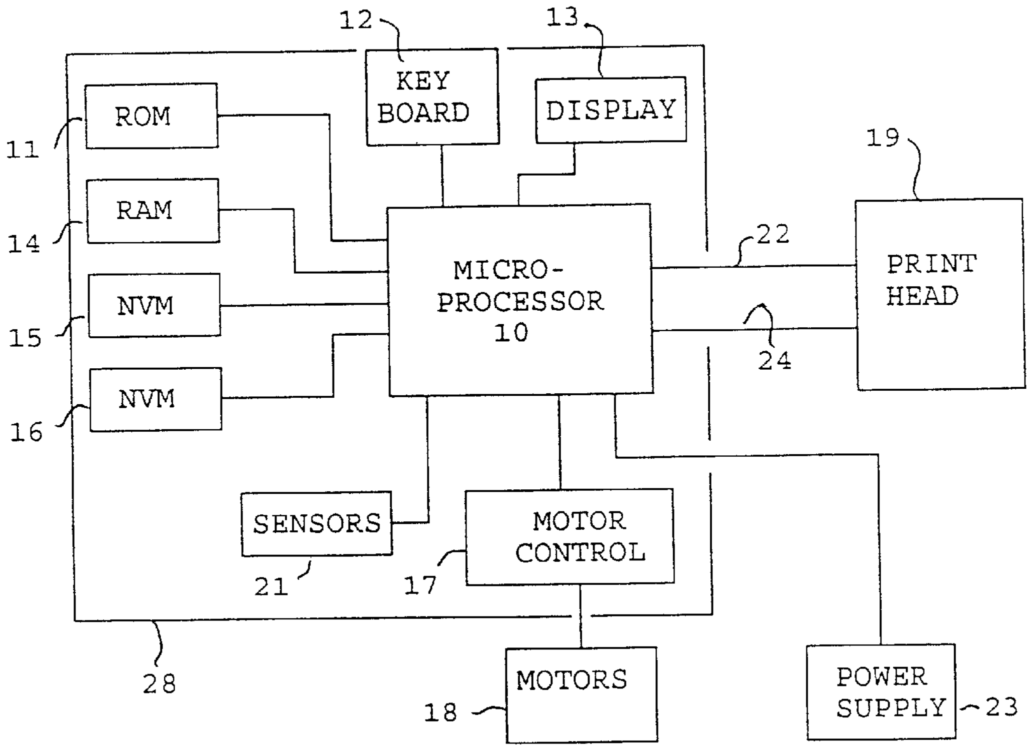
FIG. 1 is a block circuit diagram of a postage meter utilising a digital printer.

Referring first to FIG. 1, the postage meter includes electronic accounting and control means comprising a micro-processor 10 operating under program routines stored in a read only memory (ROM) 11. A keyboard 12 is provided for input of commands and data by a user and a display 13 is provided to enable display of information to the user. A random access memory (RAM) 14 is provided for use as a working store for storage of temporary data during operation of the postage meter. Non-volatile duplicated memories 15, 16 are provided for the storage of critical data relating to use of the postage meter and which is required to be retained even when the postage meter is not powered. The microprocessor 10 carries out accounting functions in relation to use of the postage meter for franking mail items with postage charges applicable to handling of the mail items by the postal authority or another carrier. Accounting data relating to use of the postage meter for printing franking impressions representing postage charges for mail items and any other critical data to be retained is stored in the non-volatile memories 15, 16. The accounting data includes a value of credit available for use by the meter in franking mail items, an accumulated total of value used by the meter in franking mail items, a count of the number of mail items franked by the meter and a count of the number of mail items franked with a postage charge in excess of a predetermined value. The value of credit is stored in a descending credit register, the accumulated total value is stored in an ascending tote register, the count of items is stored in an items register and the count of items franked with a postage charge in excess of a predetermined value is stored in a large items register. As is well known in the postage meter art, each of the registers referred to hereinbefore for storing accounting data is replicated in order to enable integrity of the accounting data to be maintained even in the event of a fault or termination of power to the meter during a franking operation. Two replications of each of the registers are provided in each of the memory devices 15, 16.

A motor controller 17 is controlled by the microprocessor to control operation of motors 18 driving means (not shown) for feeding a mail item past a digital print head 19 or for moving the print head over the mail item. The digital print head 19 may be a thermal print head, an ink jet print head or any other type of digital print head including selectively operable printing elements. Sensors 21 are provided to sense and monitor feeding of the mail item past the printing elements or for sensing movement of the print head over the mail item. The sensors provide signals to the microprocessor to enable the microprocessor to selectively energise the print elements of the print head at appropriate times synchronised with the relative movement of the print head and the mail item. During this relative movement the microprocessor outputs on line 22, in each of a series of printing cycles, print data signals selecting those ones of the printing elements which are to be energised in each respective printing cycle. A pulse of electrical power is supplied to the selected printing elements from a power source 23 when a strobe signal is supplied by the microprocessor on a line 24 to the print head.

The printing elements are disposed in a line extending transversely to the direction of relative movement between the print head and the mail item. Energisation of selected printing elements of the print head in a printing cycle causes deposition of corresponding dots of ink on the mail item. If the print head is an ink jet print head, energisation of a selected printing element causes a droplet of ink to be ejected through a nozzle onto the mail item. If the print head is a thermal print head, energisation of a selected printing element heats an area of an ink layer of a thermal transfer ink ribbon adjacent the energised printing element. Heating of an area of the ink layer causes the heated area to adhere more strongly to the mail item than to a substrate backing layer of the ribbon so that when the ribbon is peeled from the mail item after passing the print head, the heated area remains adhered to the mail item to form a printed dot in a required location in a row and the unheated part of the ink layer remains adhered to the backing layer of the ribbon as it is peeled from the mail item. Instead of transferring ink from an ink ribbon, heating of the thermal printing elements may act directly upon a print receiving medium that is responsive to the application of heat.

Because there is relative movement between the print head and the mail item during the printing operation, repeated selection and energisation of selected printing elements in a series of printing cycles results in printing of dots in required positions of a corresponding series of columns spaced along the mail item in the direction of the relative movement. Accordingly a complete printed impression is built up in a column by column manner in the series of printing cycles of a printing operation.

It will be appreciated that, as is well known in the postage meter art, the postage meter must operate in a secure manner and be protected from attempts to use the meter fraudulently for example by utilising the postage meter to print franking impressions on mail items for which no corresponding postage charge has been accounted for by the accounting means. Accordingly those parts of the postage meter required to be secured against unauthorised tampering are housed in a secure housing 28.

It will be appreciated that from time to time the print head may need to be replaced. In the case of thermal print heads, the thermal printing elements may become defective in which case the entire print head must be replaced. In the case of ink jet print heads the printing elements of the print head may become defective but also it is common for ink jet print heads to have an integral ink supply and hence the print head needs to be replaced not only as a result of mal-functioning elements but also because the ink supply has become depleted.

In order to ensure the integrity of operation of the postage meter it is desirable that means are provided whereby a replacement print head can be identified either by the electronic circuits of the postage meter or by visual inspection of the printed postage indicia.

It will be appreciated that standard manufactured print heads of a specific design are substantially uniform and do not differ from one another other than due to manufacturing tolerances. For example ink jet print heads have nozzles disposed in an array which is nominally the same for each head of the same design. Thus the printing elements such as nozzles are positioned within manufacturing tolerances and do not have any characteristic which would enable recognition of a specific print head.

The present invention permits customisation of standard print heads after manufacture of the print head. This customisation may be effected either prior to mounting of the print head in the printing apparatus or after initial mounting of the print head in the printing apparatus.

Figure 2:
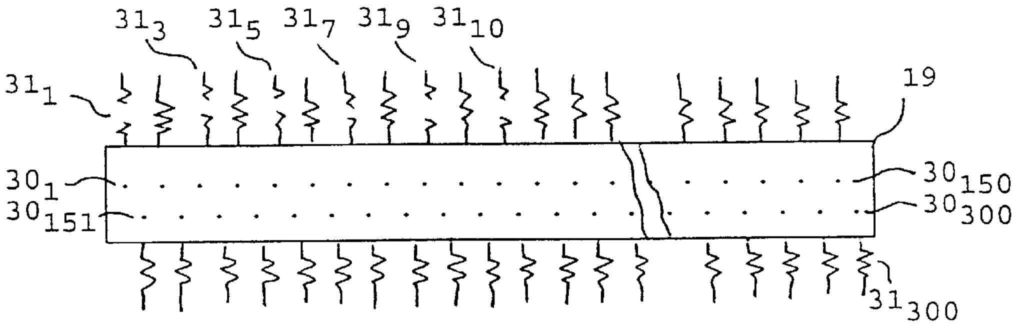
FIG. 2 is diagram illustrating the nozzles and resistive elements of an ink jet print head.

Referring to FIG. 2 an ink jet print head 19 is provided with a plurality of nozzles $\mathbf{30}_1$–$\mathbf{30}_{300}$ disposed alternately in two lines, the nozzles being contained in a space of approximately ½ inch (12.5 cm) length. The nozzles of one line are inter-digitated with the nozzles of the other line to provide a printing resolution of 600 dpi. A plurality of resistor elements $\mathbf{31}_1$–$\mathbf{31}_{300}$ are associated one with each of the nozzles $\mathbf{30}_1$–$\mathbf{30}_{300}$. Energisation of the resistor elements creates a bubble in ink adjacent the corresponding nozzle and this causes ejection of a droplet of ink from that nozzle.

In order to implement the present invention, certain of the nozzles and associated resistor elements are not used for printing the postage indicia. The unused nozzles may be a group of adjacent nozzles, for example nozzles $\mathbf{30}_1$ to $\mathbf{30}_{10}$, located at one end of the lines of nozzles or the unused nozzles may be located at both ends or dispersed along one or other of the lines of nozzles, the printing resolution being reduced in the regions of the unused nozzles. The unused nozzles may be located in positions where the indicia to be printed does not contain critical postage data, for example in positions where the nozzles are required only to print parts of a pattern of the postage indicia and not where the nozzles are required to print critical postage data such as postage amount.

When it is not required to have a 600 dpi printing resolution, the nozzles of one line, for example nozzles $\mathbf{30}_{151}$–$\mathbf{30}_{300}$, may be utilised for printing postage indicia with a 300 dpi resolution and nozzles of the other line, nozzles $\mathbf{30}_1$–$\mathbf{30}_{150}$ may be unused in printing the postage indicia.

Identification data is imparted to the print head by selectively altering electrical characteristics of selected ones of the resistor elements, in this example $\mathbf{31}_1$ to $\mathbf{31}_{10}$, associated with those nozzles which are not used in printing the postage indicia.

In normal operation of the print head the amount of electrical energy input to the resistor elements in energisation thereof is carefully controlled to ensure proper functioning of the print head. Identification data is imparted to the print head by inputting an amount of electrical energy higher than in normal operation of the print head to selected ones of the resistor elements associated with nozzles not used in printing. The amount of electrical energy is chosen to be sufficiently high as to alter the electrical characteristic of the selected resistor elements and for example it may be sufficiently high to fuse the resistor element or merely sufficient as to significantly alter the electrical resistance of the resistor element. The selection of resistor elements subjected to input of the high electrical energy is based on a code. For example if the code is binary 10110, the electrical characteristic of resistors $\mathbf{31}_1$, $\mathbf{31}_5$, $\mathbf{31}_7$ is altered to represent binary '1' and the electrical characteristic of resistors $\mathbf{31}_3$, $\mathbf{31}_9$ is left unaltered to represent binary '0'. The application of high electrical energy to a resistor element may cause some damage to adjacent resistor elements or nozzles. Accordingly it is desirable that any resistor element intended to represent a bit of the code is spaced from any other resistor element intended to represent a bit of a code or any resistor element associated with a nozzle intended for printing by at least one unused resistor element, or if used, is a non-significant resistor element. Hence in the example illustrated, resistors $\mathbf{31}_2$, $\mathbf{31}_4$, $\mathbf{31}_6$, $\mathbf{31}_8$ and $\mathbf{31}_{10}$ are not used to represent bits of the code.

A current sensing system may be used to check the resistor elements. The microprocessor 10 may carry out a print head checking routine in which current is passed through each of the resistor elements one after another and thereby identify those resistor elements having an altered electrical characteristic. Having identified the altered resistor elements, the microprocessor can then recognise any code represented by the altered resistor elements. If the microprocessor recognises the code as being a valid code for a print head in that postage meter, the postage meter is operative to be used in printing postage indicia. However if the code is not recognised as a valid code, printing of postage indicia is inhibited. The code may also be used to ensure that the usage of a print head is limited to a predetermined number of printing operations.

It is to be understood that altering of the electrical characteristic of selected resistor elements may be effected prior to mounting the print head in the postage meter or may be effected after the print head has been mounted. In the latter case, alteration of the characteristic of selected resistor elements may be effected by the microprocessor 10.

If the microprocessor is capable of altering the characteristic of selected resistor elements, alteration of the characteristic of the resistor elements may be utilised for storing data other than print head identification data. For example the data may represent status information. Status information may include "further printing prohibited" or "no of ink units used". The identification data and status information may include data checking bits to enable the data recorded by the altered resistor elements to be verified. Redundant data may be included to increase reliability of the data. Also the data may be encrypted or include a digital signature to ensure the integrity of the data.

Instead of the microprocessor checking the characteristics of the resistor elements to determine the code represented by the resistor elements, the code may be detected from examination of a printed image printed by operation of the print head. When nozzles in one line of nozzles are unused for normal printing, the data represented by the unused nozzles may be determined by effecting a print operation with the unused nozzles and then examining the resultant printed image.

Generally the printing elements allocated for representing the code data will not be allocated for use for printing in normal printing operations. However it is envisaged that in some circumstances printing elements may be utilised for representing the data as well as being used for printing.

I claim:

1. A method of registering data in relation to a digital print head having a plurality of selectively energizable printing elements, said method comprising steps of allocating first printing elements of said plurality of printing elements for representing data, and permanently altering a characteristic of selected ones of said first printing elements to represent said data.

2. A method according to claim 1, wherein the characteristic altered in said altering step is an electrical characteristic of the selected first printing elements.

3. A method of registering data in relation to a digital print head having a plurality of selectively operable print elements, said method comprising steps of allocating first printing elements of said plurality of printing elements for representing data, allocating second printing elements of said plurality of printing elements for printing required impressions and permanently altering a characteristic of selected first printing elements to represent said data.

4. A method according to claim 3, wherein the characteristic altered in said altering step is an electrical characteristic of said selected first printing elements.

5. A method according to claim 4, wherein each of said printing elements includes a resistive element and the altering step includes fusing the resistive element of each selected first printing element.

6. A printing apparatus including a digital print head having a plurality of printing elements, wherein first ones of said printing elements are allocated for printing impressions and second ones of said printing elements are allocated for representing data, and further comprising means for changing an electrical characteristic of selected ones of said second elements to represent said data.

7. A printing apparatus according to claim 6, wherein the second printing elements include operable resistive elements and the data writing means is operable to fuse the resistive elements of the selected second printing elements.

8. A printing apparatus according to claim 7, wherein said fused resistive elements are inoperable to print, and further including means for applying energization signals to all of the second printing elements to cause those second elements not selected to print an impression representing the data.

9. A printing apparatus according to claim 6, wherein the printing elements include ink jet nozzles from which ink is ejected by energization of the resistive elements.

10. A printing apparatus according to claim 6, wherein said first printing elements are disposed in a first line and said second printing elements are disposed in a second line parallel to and spaced from the first line.

11. A printing apparatus according to claim 6, including data recognition means for checking the electrical characteristic of the second printing elements to determine the data represented thereby.

12. A postage meter including the printing apparatus of claim 6.

* * * * *